No. 726,514. PATENTED APR. 28, 1903.
O. DAVIS.
ROOT CUTTER.
APPLICATION FILED FEB. 5, 1903.
NO MODEL.
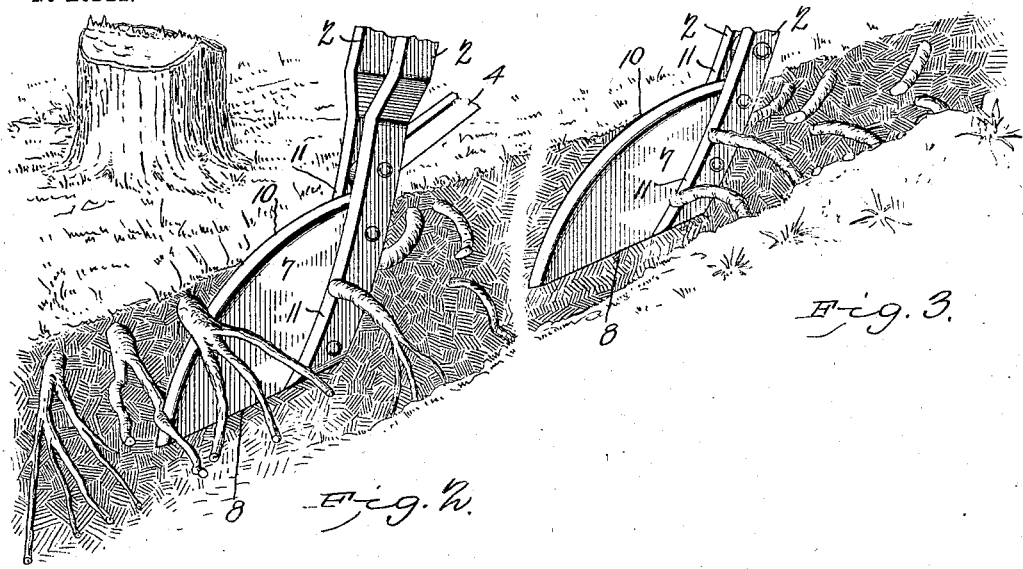
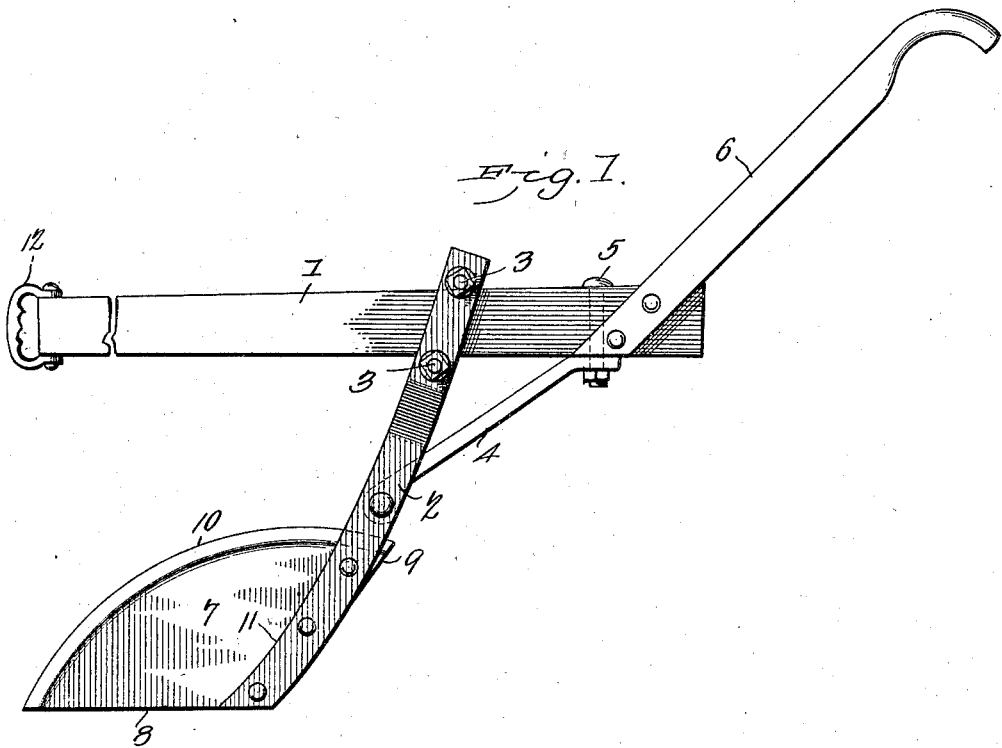
Witnesses
Orren Davis, Inventor
Attorneys

UNITED STATES PATENT OFFICE.

ORREN DAVIS, OF MOUNT ANDREW, ALABAMA.

ROOT-CUTTER.

SPECIFICATION forming part of Letters Patent No. 726,514, dated April 28, 1903.

Application filed February 5, 1903. Serial No. 142,055. (No model.)

*To all whom it may concern:*

Be it known that I, ORREN DAVIS, a citizen of the United States, residing at Mount Andrew, in the county of Barbour and State of Alabama, have invented a new and useful Root-Cutter, of which the following is a specification.

This invention relates to an improved root-cutter adapted to be used for the purpose of breaking land for cultivation when such land contains large quantities of roots of trees or stumps, which would ordinarily interfere with the proper cultivation of the land to such an extent as to render it almost impracticable.

My invention has for its object to provide a device of this class which shall be so constructed as to adapt it not only to cut or sever roots of such a diameter that no impression will be made upon them by implements ordinarily used for the purpose, but which will also dislodge the severed ends of such roots to cause them to be easily upturned and subjected to influences whereby their speedy decay shall be insured.

With these and other ends in view my invention consists in the improved construction, arrangement, and combination of parts, which will be hereinafter fully described, and particularly pointed out in the claims.

In the accompanying drawings, Figure 1 is a side view of an implement constructed in accordance with the principles of my invention. Figs. 2 and 3 are perspective detail views to illustrate various stages of the operation of the same.

Corresponding parts in the several figures are indicated by similar numerals of reference.

My invention comprises a beam 1, having a foot or standard which is composed of two side members 2 2, extending downwardly and curved in a forward direction, as shown. These side members are secured on opposite sides of the beam by means of clamping-bolts 3 3, extending through suitable perforations in said side members above and below the beam, as will be seen in Fig. 1, thus avoiding puncturing, and thereby weakening the beam. The side members 2 2 converge below the beam, as will be seen, and between them is secured the lower end of a brace 4, which extends upwardly and rearwardly and is secured to the beam near the rear end of the latter by means of a vertical bolt 5. Handles 6 6 are also provided, said handles being attached in the usual or in any well-known manner.

7 designates a sector-shaped knife or cutter having approximately straight lower and rear edges 8 and 9, which are disposed at an obtuse angle to each other, and a segmentally-rounded cutting edge 10. This cutter is firmly scured between the lower ends of the side members 2 2 of the foot below the point at which the lower end of the brace 4 is attached, the means of attachment being usually either bolts or rivets, which, however, must be sufficiently strong to enable the cutter to resist the rough usage to which it will be occasionally subjected. The cutter itself is preferably manufactured of steel about one-quarter of an inch in thickness, and it is provided with a cutting edge sufficiently sharp to perform the operation assigned to it with ease and certainty. It will be observed that the lower ends of the side members 2 2 of the foot are bolted or otherwise secured to the opposite sides of the knife or cutter adjacent to the rear edge of the latter. Said side members, which are necessarily of a thickness exceeding that of the cutter—say one-half inch—will thus present shoulders (designated 11 11) adjacent to the sides of the cutter. Ordinarily in an implement of this kind such shoulders or protruding parts would be avoided; but in my present invention they are purposely formed in order to render the operation of the device more thorough and effective, as will be now described.

In the operation of the device draft is attached in the usual manner, as by means of a clevis 12, to the front end of the beam. The knife or cutter is inserted into the soil and is held in the ground by the upwardly and rearwardly extending shoulders 11 of the foot, which will cause a downward pressure upon the blade of the device. When roots are encountered, they will be readily cut or severed by the sharp cutting edge, the shape of which causes a glancing cut to be delivered, which will be effective even when the roots lie squarely across the path of the cutter, while when the roots are obliquely disposed with relation to the cutter the cutting operation will be facilitated. The roots having been severed, the severed ends will next be subjected to the action of the shoulders formed by the lower ends of the side members 2 of the foot which serve to push the severed ends of the roots apart, as will be seen in Fig. 3 of the drawings. Being thus disposed, it follows that the land subjected to the action of my improved root-cutter may be readily upturned by means of an ordinary plow or cultivating implement. In Fig. 2 I have shown the blade of the cutter approaching a root, while in Fig. 3 the root has been severed.

It will be understood from the foregoing description that my improved implement is not in any sense a plow or cultivator, and I desire, moreover, to state that it is not intended to use this improved implement in direct connection with a plow, except only as preceding the operation of an ordinary turning-plow. By means of this device land which by ordinary means is absolutely incapable of being tilled may be rendered into a fit state for turning by an ordinary turning-plow, thus enabling much land which has heretofore been left idle to be reclaimed and profitably cultivated.

Having thus described my invention, I claim—

1. In a device of the class described, a sector-shaped cutter having lower and rear edges at an obtuse angle to each other, and a segmentally-rounded cutting edge, in combination with a foot comprising side members secured to opposite sides of said cutter adjacent to the rear edge thereof, the front edges of said foot members presenting shoulders adjacent to the sides of the cutter.

2. In a device of the class described, a sector-shaped cutter having lower and rear edges at an obtuse angle to each other and a segmentally-rounded cutting edge, a foot comprising side members secured to opposite sides of said cutter adjacent to the rear edge thereof, the front edges of said foot members presenting shoulders adjacent to the sides of the cutter, and said side members diverging upwardly, a beam clamped between the upper ends of said side members, a brace having one end secured between the converging parts of said side members and the other end secured to the beam near the rear end of the latter, and connecting means.

In testimony that I claim the foregoing as my own I have hereto affixed my signature in the presence of two witnesses.

ORREN ✕ DAVIS.
his mark

Witnesses:
J. P. DAVIS,
W. P. BRITT.